United States Patent
Takata et al.

(10) Patent No.: US 7,677,757 B2
(45) Date of Patent: Mar. 16, 2010

(54) LAMP HOLDER, BACKLIGHT DEVICE USING THE SAME, AND DISPLAY USING THE SAME

(75) Inventors: Yoshiki Takata, Suzuka (JP); Tatsuya Kudari, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 128 days.

(21) Appl. No.: 11/720,175

(22) PCT Filed: Nov. 8, 2005

(86) PCT No.: PCT/JP2005/020473

§ 371 (c)(1),
(2), (4) Date: May 24, 2007

(87) PCT Pub. No.: WO2006/059463

PCT Pub. Date: Jun. 8, 2006

(65) Prior Publication Data

US 2008/0143915 A1   Jun. 19, 2008

(30) Foreign Application Priority Data

Nov. 30, 2004   (JP) ............................ 2004-347323

(51) Int. Cl.
   *F21V 21/00* (2006.01)
(52) U.S. Cl. .................. 362/225; 362/217.09; 362/396
(58) Field of Classification Search .................. 362/29, 362/30, 225, 260, 396, 614, 632, 633, 634, 362/97.1, 97.2, 217.08, 217.09
See application file for complete search history.

(56) References Cited

U.S. PATENT DOCUMENTS 3,210,532 A * 10/1965 Woofter et. al. ............. 362/235
4,870,484 A    9/1989 Sonehara
6,641,281 B2 * 11/2003 Cheng ........................ 362/396
6,722,773 B2   4/2004 Tsai et al.
7,059,736 B2   6/2006 Yu et al.

(Continued)

FOREIGN PATENT DOCUMENTS

JP   48-102466 U   12/1973

(Continued)

OTHER PUBLICATIONS

International Search Report issued in a counterpart International Application NO. PCT/JP2005/015939; mailed on Nov. 22, 2005.

(Continued)

*Primary Examiner*—Y My Quach Lee
(74) *Attorney, Agent, or Firm*—Keating & Bennett, LLP

(57) ABSTRACT

A lamp holder includes a mounting portion, a lamp holding part which is connected to the mounting portion, and includes an end capable of surrounding a peripheral surface of a lamp, and is capable of being elastically opened and deformed with attaching and detaching of the lamp. The present invention also includes a recessed portion positioned at an opposed surface to the lamp in the lamp holding part and in a position between an end portion and a connecting region to a mounting portion, such that the recessed portion allows the lamp holding part to bend so that the end portion displaces in a direction to be away from the peripheral surface of the lamp.

17 Claims, 15 Drawing Sheets

U.S. PATENT DOCUMENTS

| | | |
|---|---|---|
| 7,070,313 B2 | 7/2006 | Kim et al. |
| 2002/0149713 A1 | 10/2002 | Ishida et al. |
| 2004/0156183 A1 | 8/2004 | Kim |
| 2005/0225992 A1 | 10/2005 | Idei et al. |
| 2005/0270803 A1 | 12/2005 | Tsai et al. |
| 2005/0281039 A1* | 12/2005 | Yeh .............................. 362/396 |

FOREIGN PATENT DOCUMENTS

| | | |
|---|---|---|
| JP | 60-45481 U | 3/1985 |
| JP | 05-67021 A | 9/1993 |
| JP | 06-95110 A | 4/1994 |
| JP | 08-291881 A | 11/1996 |
| JP | 10-326517 A | 12/1998 |
| JP | 11-329040 A | 11/1999 |
| JP | 2001-210126 A | 8/2001 |
| JP | 2002-268573 A | 9/2002 |
| JP | 2002-311418 A | 10/2002 |
| JP | 2003-346541 A | 12/2003 |
| JP | 2004-022287 A | 1/2004 |
| JP | 2004-039476 A | 2/2004 |
| JP | 2004-139871 A | 5/2004 |
| JP | 2004-158224 A | 6/2004 |
| JP | 2004-207196 A | 7/2004 |
| JP | 2004-303538 A | 10/2004 |

OTHER PUBLICATIONS

International Search Report issued in a counterpart International Application No. PCT/JP2005/020475 mailed on Jan. 24, 2006.
International Search Report issued in a counterpart International Application No. PCT/JP2005/020476; mailed on Jan. 24, 2006.
International Search Report issued in a counterpart International Application No. PCT/JP2005/014667; mailed on Nov. 22, 2005.
International Search Report issued in a counterpart International Application No. PCT/JP2005/020473; mailed on Jan. 24, 2006.
Kentaroh Aoki et al.; "Lighting Device for Display Device and Display Device"; U.S. Appl. No. 11/557,345, filed Nov. 7, 2006.
Hiroki Azuma et al.; "Lamp Holding Apparatus, Lighting Device for Display Device Including Same, Display Device Including Same and Liquid Crystal Display Device Includinglighting Device for Display Device"; U.S. Appl. No. 11/560,259, filed Nov. 15, 2006.
Yoshiki Takata et al.; "Lamp Holding Apparatus, Backlight Device for Display Device Including Same, Display Device Including Same and Liquid Crystal Display Device Including Backlight Device for Display Device"; U.S. Appl. No. 11/560,272, filed Nov. 15, 2006.
Kentaroh Aoki et al.; "Illuminating Apparatus for Displaying Apparatus and Displaying Apparatus"; U.S. Appl. No. 11/719,612, filed May 17, 2007.
Official communication issued in a counterpart Japanese Application No. 2006-520459, mailed on Nov. 28, 2006.
Official communication issued in a counterpart Japanese Application No. 2006-520459, mailed on Feb. 27, 2007.

* cited by examiner

LAMP HOLDER, BACKLIGHT DEVICE USING THE SAME, AND DISPLAY USING THE SAME

BACKGROUND OF THE INVENTION

1. Field of the Invention

The present invention relates to a lamp holder, a backlight device using the same, and a display using the same.

2. Description of the Related Art

For example, a liquid crystal panel used for a liquid crystal display such as a liquid crystal television additionally requires a backlight device as an external lamp because it does not spontaneously emit light. The backlight device is placed on a backside of the liquid crystal panel, and broadly includes a base made of a metal with an open surface at the side of the liquid crystal panel, a number of cold cathode tubes housed in the base as lamps, and a number of optical members (diffusion sheets and the like) which are arranged in an open portion of the base to efficiently irradiate light, which is emitted by the cold cathode tubes, to the liquid crystal panel side, and includes lamp clips for holding the cold cathode tubes, each having a slim tubular shape with respect to the base.

An example of the lamp clips as described above can be found in Japanese Patent Laid Open No. 2001-210126. The lamp clips of this invention are made of a synthetic resin, and the invention includes a mounting plate which is applied to an inner surface of the base, a locking part which is protruded to the base side from the mounting plate, is inserted into a mounting hole of the base to be capable of being locked to its peripheral edge, and a lamp holding part which is protruded to the side opposite from the locking part from the mounting plate to be capable of holding the cold cathode tube so as to surround the peripheral surface of the cold cathode tube. The lamp holding part has a C-shaped sectional configuration which is opened upward, and is elastically deformable so as to open outward during attachment and detachment of the cold cathode tube.

Incidentally, typically there is a variation in the thickness of the cold cathode tube that cannot be prevented due to a manufacturing error. Thus, setting the size of the lamp holding part which holds such a cold cathode tube can be problematic.

If the size of the lamp holding part is set with the thickest cold cathode tube in tolerance as a reference, the clearance which occurs between the lamp holding part and the cold cathode tube becomes too large when a relatively thin cold cathode tube is mounted, and large backlash occurs to the cold cathode tube.

If the size of the lamp holding part is set with the thinnest cold cathode tube in tolerance as the reference in contrast with the above-described situation, the force which is required for opening and deforming the lamp holding part becomes too large when a relatively thick cold cathode tube is mounted. Even if it is mounted, the elastic rebound force of the lamp holding part becomes too large, and therefore, there arises the problem that the cold cathode tube is urged in the detaching direction by the elastic rebound force and the cold cathode tube is easily detached, and in short, this setting method is not favorable with respect to attaching and detaching operability and holding performance. Nevertheless, there are limitations in the molding technique and strength in molding the lamp holding part to be thin in order to reduce the elastic rebound force of the lamp holding part, thus bringing about difficulties in coping with this situation.

SUMMARY OF THE INVENTION

In order to overcome the problems described above, preferred embodiments of the present invention suppress backlash while ensuring reliable attaching and detaching operability and maintaining excellent performance.

According to a preferred embodiment of the present invention, a lamp holder includes a mounting portion, a lamp holding part which is connected to the mounting portion, and includes an end capable of surrounding a peripheral surface of a lamp, and is capable of being elastically opened and deformed during attaching and detaching of the lamp, and a recessed portion positioned at an opposed surface of the lamp holding part that is opposite to the lamp and that is between an end portion and a connecting region connected to the mounting portion, wherein the recessed portion allows the lamp holding part to bend so that the end portion is displaced in a direction away from the peripheral surface of the lamp.

With the above constitution, by providing the recessed portion at the opposed surface of the lamp holding part at the position between the end portion and the connecting region connected to the mounting portion, the elastic rebound force which occurs to the lamp holding part at the time of opening deformation is significantly reduced. Accordingly, even if the size of the lamp holding part is set so as to be able to hold a relatively thin lamp without backlash, operability and holding performance on the occasion of attaching and detaching a relatively thick lamp can be kept favorable.

With a lamp holder according to a preferred embodiment of the present invention, a backlight device using the same, and a display using the same, even if the thickness of lamps varies due to a manufacturing error, backlash of the lamps can be prevented and minimized while maintaining attaching and detaching operability and achieving excellent performance.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described based on FIGS. 1 to 11. In the present preferred embodiment, a lamp clip 20 which is used for a backlight device 12 of a liquid crystal display 10 will be shown as an example. In the following description, a vertical direction is described with each of the drawings as a reference, and the lateral direction will be described with FIG. 3 as a reference.

Figure 1:
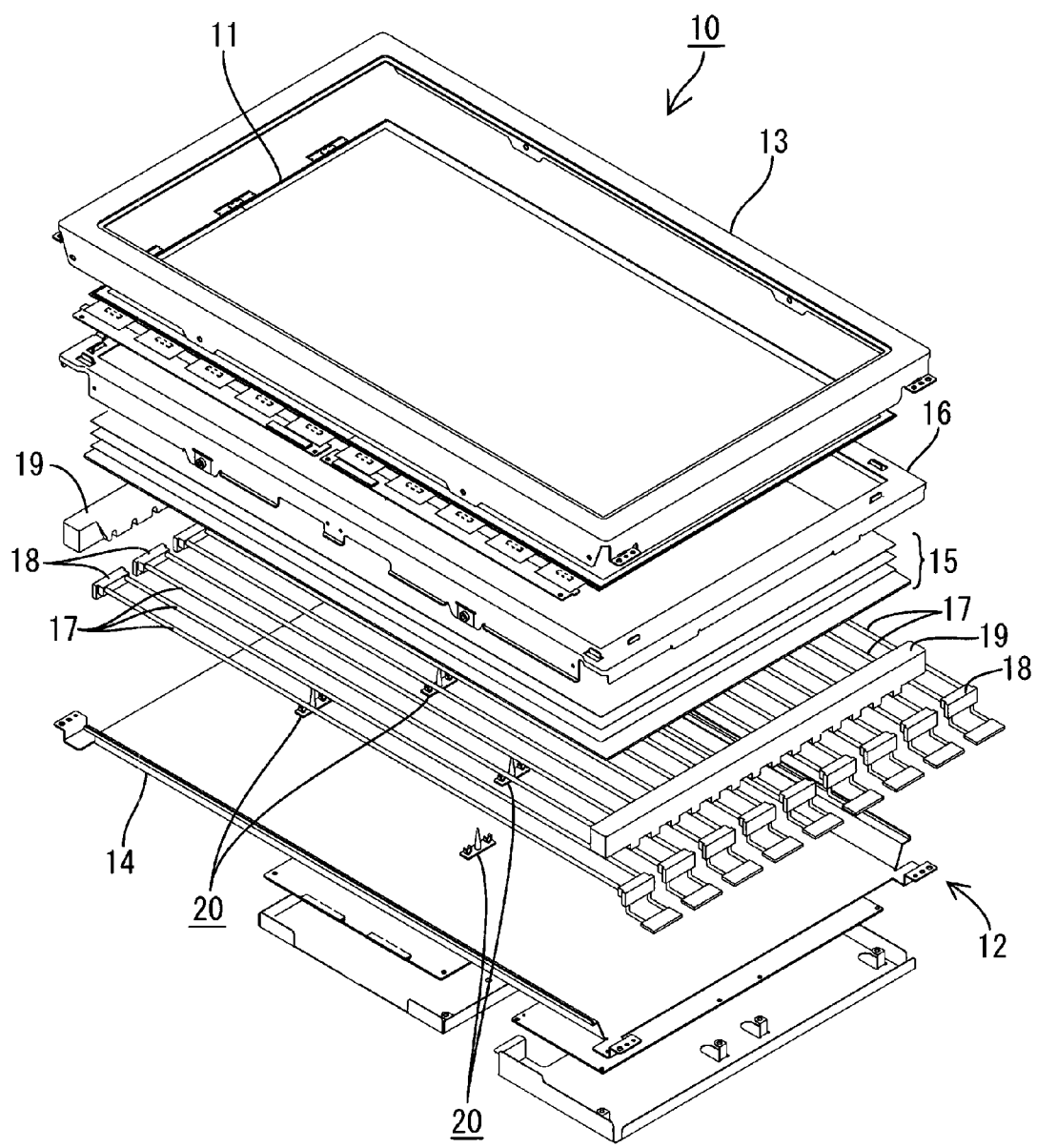
FIG. 1 is an exploded perspective view showing the outline of a liquid crystal display according to a preferred embodiment of the present invention.
Figure 2:
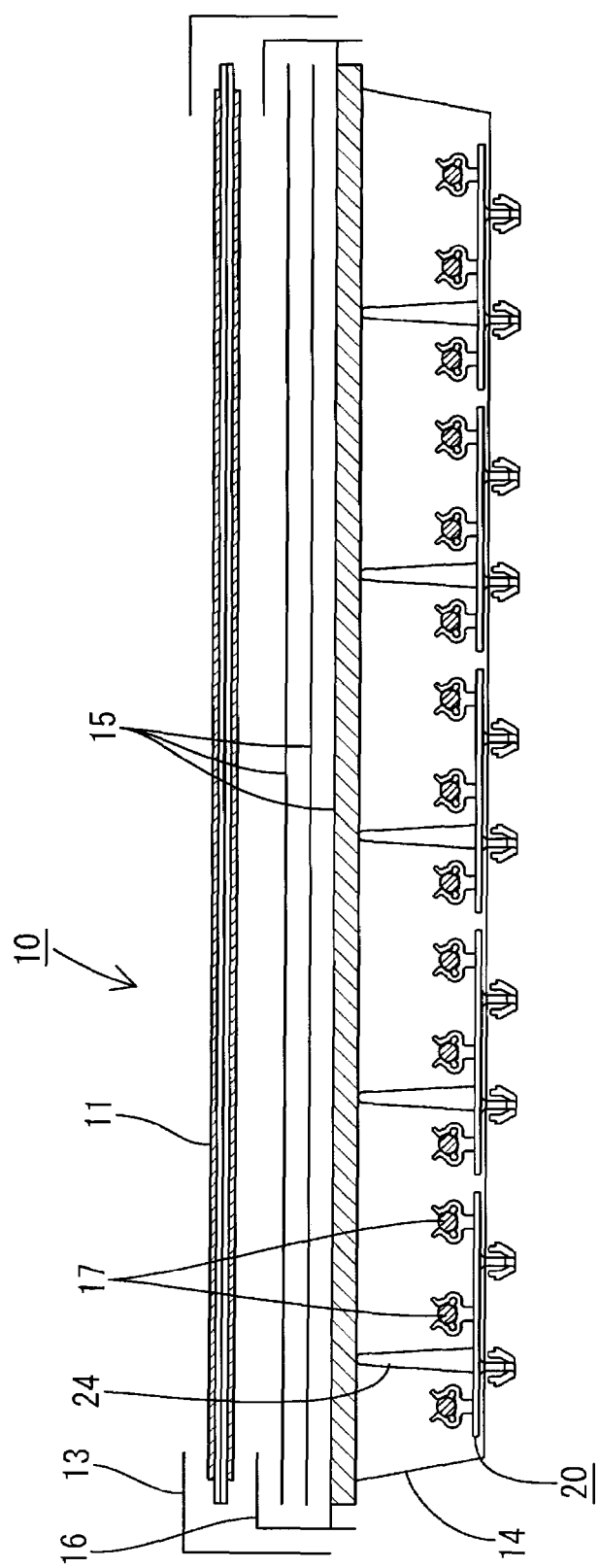
FIG. 2 is a sectional view showing the outline of the liquid crystal display.

First, a liquid crystal display 10 will be described. The liquid crystal display 10 broadly includes a liquid crystal panel 11 which preferably has a substantially rectangular shape and the backlight device 12 which is an external light source, and they are integrally held by a bezel 13 or the like, as shown in FIGS. 1 and 2. The liquid crystal panel 11 (which is a display panel) has the construction in which a pair of glass substrates are bonded to each other with a predetermined gap therebetween, and liquid crystal material is sealed between both the glass substrates. In one of the glass substrates, switching elements (for example, TFTs) connected to source wires and gate wires which are substantially perpendicular to each other are arranged in a matrix form, and in the other glass substrate, pixel electrodes of R, G and B are provided in a matrix form.

Next, the backlight device 12 will be described. The backlight device 12 includes a metal base 14 formed into a substantially rectangular box shape with a top surface side opened, a plurality of optical members 15 (a diffusion plate, a diffusion sheet, a lens sheet, an optical sheet in sequence from the lower side in the drawing) which are mounted to cover the opening of the base 14, a frame 16 for holding these optical members 15 in the base 14, cold cathode tubes 17 which are lamps housed in the base 14, rubber (for example, silicon rubber) holders 18 for holding both end portions of the cold cathode tube 17, lamp holders 19 which collectively hold a group of the cold cathode tubes 17 and a group of the lamp holders 18, and lamp clips 20 for holding the intermediate portions except for both end portions in the cold cathode tubes 17.

The cold cathode tube 17 preferably has a tubular shape which is slim and longer in one direction, and a number of (for example, 18 in FIG. 1) cold cathode tubes 17 are housed in the base 14 in the state in which they are arranged substantially parallel with each other and their lengthwise direction (axial direction) matched with the long side direction of the base 14. The outer diameter dimensions of the cold cathode tubes 17 preferably are, for example, about 3 mm to about 4 mm, but the outer diameter dimensions sometimes increase and decrease as much as about 6% to about 7% due to manufacturing errors.

The lamp clip 20 is preferably made of a synthetic resin (for example, made of polycarbonate), includes a mounting plate 21 which is applied to a wall surface of a bottom portion of the base 14, and has a construction in which locking parts 22, lamp holding parts 23 and a pin 24 are provided on the mounting plate 21. A plurality of lamp clips 20 are mounted to the base 14 so as to be able to hold each of the cold cathode tubes 17 in two spots or three spots spaced along the lengthwise direction. The entire lamp clip 20 is preferably colored white, for example, so that it becomes difficult for it to shield and reflect light emitted from the cold cathode tube 17.

Figure 3:
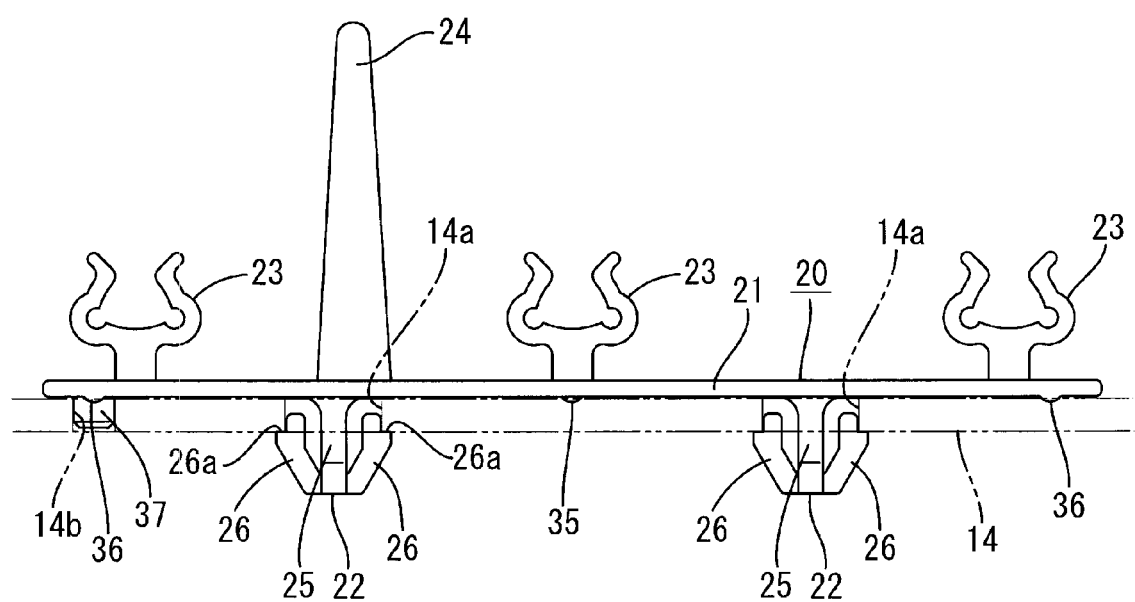
FIG. 3 is a front view of a lamp clip.
Figure 5:
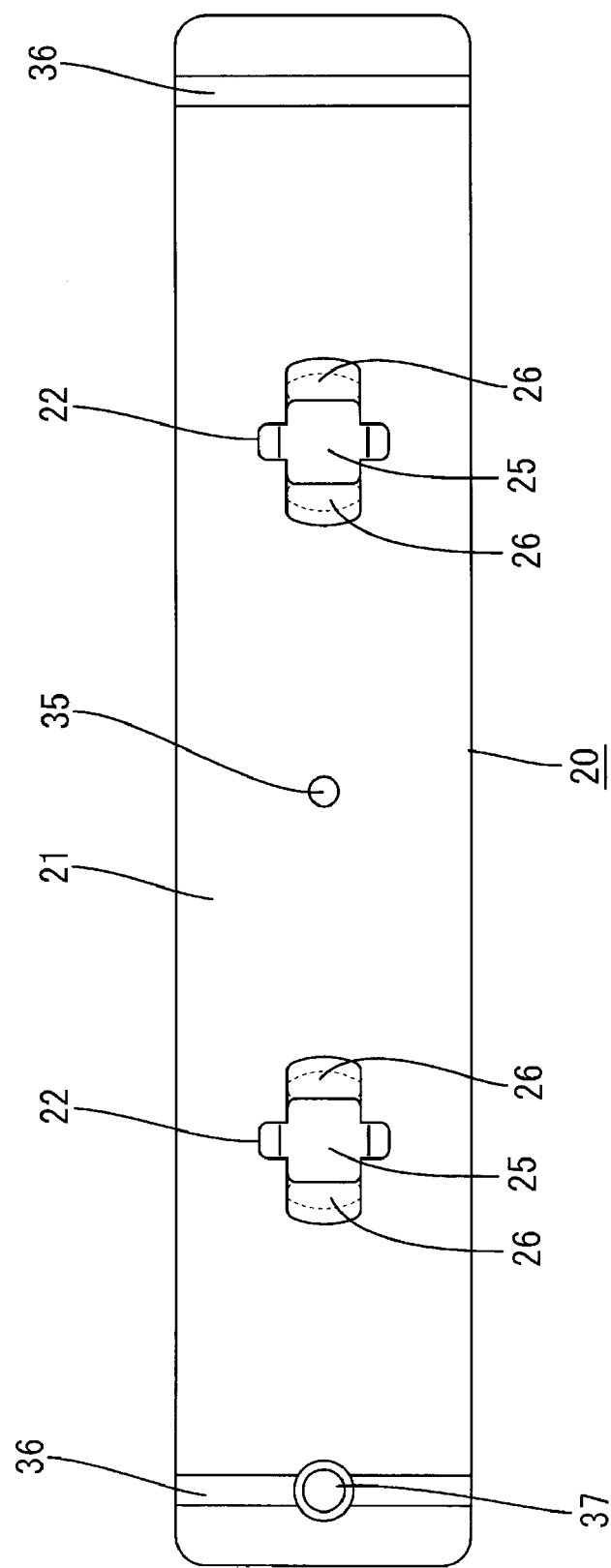
FIG. 5 is a bottom view of the lamp clip.

The mounting plate 21 preferably has a substantially rectangular shape which is slim and long along a short side direction (a direction that is substantially perpendicular to the lengthwise direction of the cold cathode tube 17) of the base 14. On the undersurface of the mounting plate 21 (opposed surface to the base 14, the surface attached to the base 14), the locking part 22 for fixing the lamp clip 20 to the base 14 is arranged to protrude downward (to the base 14 side), as shown in FIG. 3. A pair of locking parts 22 are preferably provided on the mounting plate 21, both the locking parts 22 are disposed at the positions spaced away from both end positions of the mounting plate 21 by substantially equal distances with respect to the long side direction of the mounting plate 21, and are both disposed at the approximately central position with respect to the short side direction of the mounting plate 21, as shown in FIGS. 3 and 5.

The locking part 22 includes a base portion 25 suspended from the undersurface of the mounting plate 21, and a pair of elastic locking pieces 26 which are extended diagonally upward from a tip end portion of the base portion 25 (the mounting plate 21 side while being away from the base portion 25), as shown in FIG. 3. Both the elastic locking pieces 26 are connected to both side surfaces of the tip end portion of the base portion 25, and are elastically deformable to contact and separate from the base portion 25 with their connecting portions as support points. The locking part 22 is capable of being inserted into each of the mounting holes 14a provided at the corresponding position in the base 14 to penetrate through it, and a step portion provided at a tip end portion in the elastic locking piece 26 is capable of being locked to the peripheral edge at the back side in the mounting hole 14a, and is a locking surface 26a that locks to the base 14.

Figure 4:
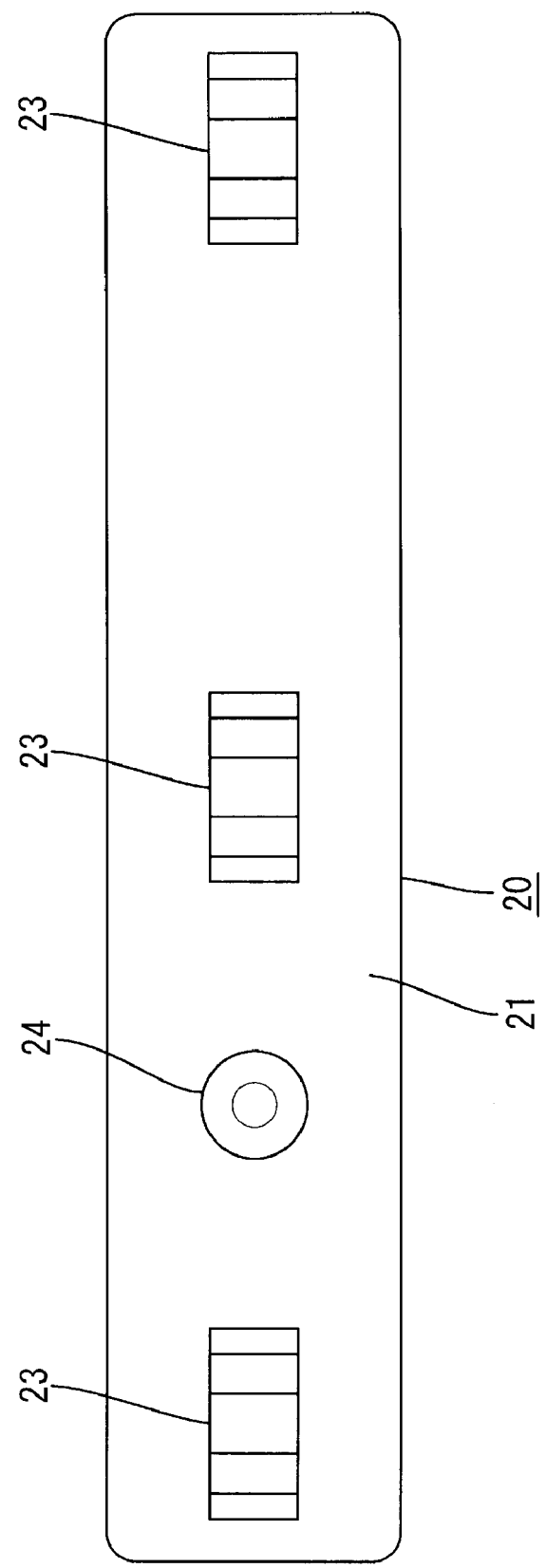
FIG. 4 is a plane view of the lamp clip.

On the top surface of the mounting plate 21 (the surface opposite to the cold cathode tube 17, the surface at the side of the opening of the base 14), the lamp holding part 23 is arranged to protrude upward for holding the intermediate portion except for both end portions in the lengthwise direction of the cold cathode tube 17. Three lamp holding parts 23 in total, for example, are preferably provided at positions which are at substantially equal distances from both end positions in the long side direction of the mounting plate 21 (in more detail, the positions outward from the locking part 22), and a substantially central position, as shown in FIG. 3 and FIG. 4. Each of the lamp holding parts 23 is disposed at an approximately central position with respect to the short side direction of the mounting plate 21.

Figure 6:
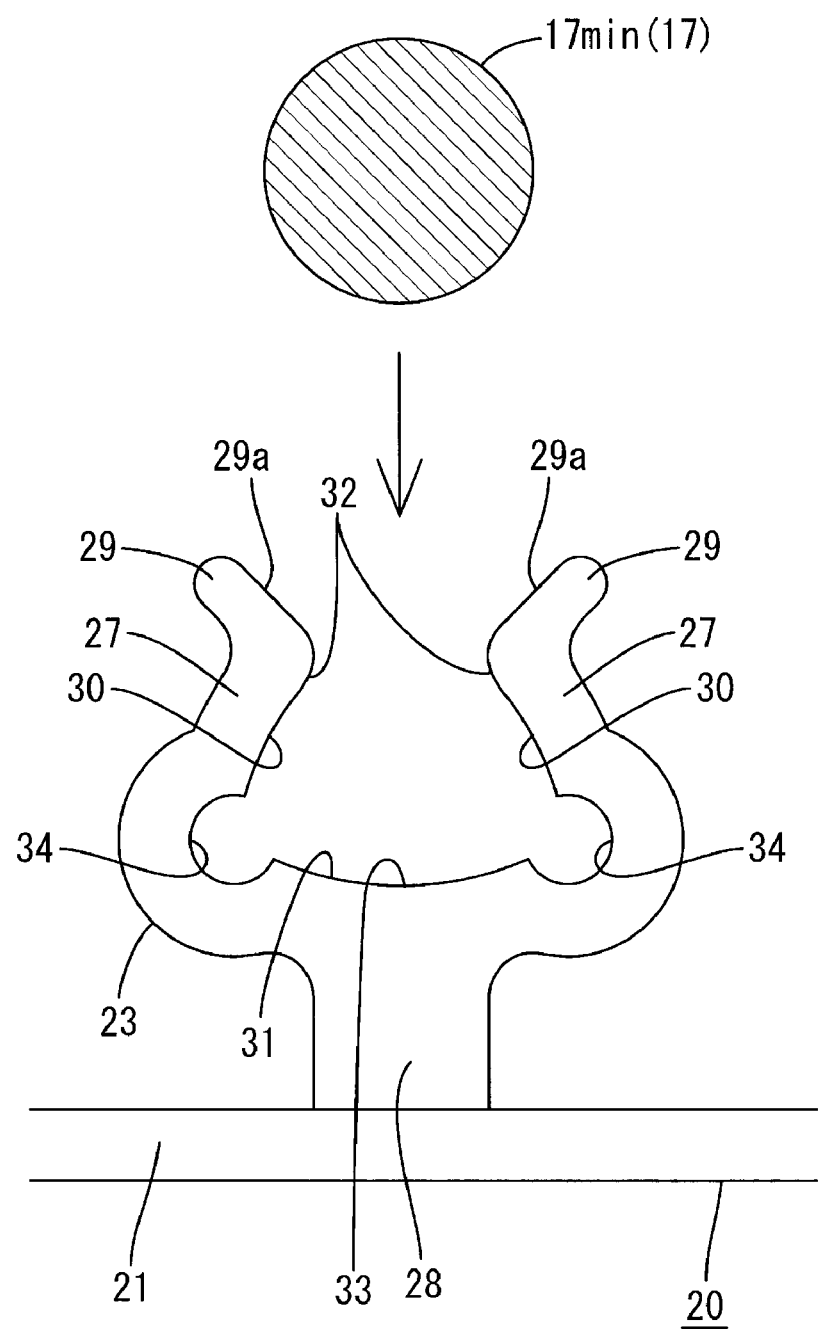
FIG. 6 is an enlarged front view showing the state before the thinnest cold cathode tube in the tolerance range is mounted.

The lamp holding part 23 is capable of surrounding the peripheral surface of the cold cathode tube 17 as a whole, and is formed into a ring shape with an end, which is opened upward to allow attachment and detachment of the cold cathode tube 17 (as shown in FIG. 6). In detail, the lamp holding part 23 includes a pair of arm portions 27 with their root portions connected to each other. The lamp holding part 23 has the construction in which both the arm portions 27 are connected to a connecting portion 28 vertically provided at the top surface of the mounting plate 21 so as to be able to hold the cold cathode tube 17 at the position where the cold cathode tube 17 is vertically spaced by a predetermined height from the mounting plate 21. Both the arm portions 27 are arranged opposite to each other to form an opening extending diagonally upward toward each other at upper portions thereof and their root portions protrude outward (opposite from each other) along the substantially horizontal direction, and preferably have shapes that are symmetrical with each other. In both the arm portions 27, the space between the tip end portions is narrower than the minimum outside dimension in the tolerance range in the cold cathode tube 17, so that attachment and detachment of the cold cathode tube 17 are allowed through this gap, and both the arm portions 27 are capable of being elastically opened and deformed (elastically deformable while enlarging the gap between the tip end portions) during attachment and detachment.

Guide portions 29 which protrude diagonally upward to the outside so as to be spaced away from each other are respectively provided on outer surfaces of the tip end portions of both the arm portions 27. Inner surfaces of both the guide portions 29 include guide surfaces 29a having a tapered shape, and the distance between both the guide surfaces 29a becomes gradually wider as it extends upward. The receiving width for the cold cathode tube 17 in the lamp holding part 23 gradually increases toward the front side in the mounting direction, and therefore, mounting of the cold cathode tube 17 is facilitated. Both the guide surfaces 29a are arranged to define substantially a right angle with each other.

Inner peripheral surfaces of both the arm portions 27 include three slightly circular arc surfaces 30 and 31 which are formed at the root portions and near both the tip end portions, and when the virtual tangential lines of the respective substantially circular arc surfaces 30 and 31 are connected, an equilateral triangle is formed. Each of the substantially circular arc surfaces 30 and 31 is formed to be less sharply curved than the peripheral surface of the cold cathode tube 17, and in other words, the curvature of each of the substantially circular arc surfaces 30 and 31 is smaller than the curvature of the peripheral surface of the cold cathode tube 17. With respect to both the substantially circular arc surfaces 30 at the tip end sides of both the arm portions 27 of the respective substantially circular arc surfaces 30 and 31, their tip end portions define point contact portions 32 capable of being in point contact with the cold cathode tube 17 in a circumferential direction, and with respect to the substantially circular arc surface 31 at the root side, its central portion defines a point contact portion 33 capable of being in point contact with the cold cathode tube 17 in a circumferential direction. Both the point contact portions 32 at the tip end sides of both the arm portions 27 can press the cold cathode tube 17 from above, in the detaching direction of the cold cathode tube 17. The substantially circular arc surface 31 at the root portions of both the arm portions 27 is formed so that the central portion in its circumferential direction is the deepest, and therefore, it can guide the cold cathode tube 17 to be mounted to the central position. In the mounted state, the respective point contact portions 32 and 33 are located at the vertexes of an isosceles triangle or an equilateral triangle though it differs depending on the thickness of the cold cathode tube 17 (see FIG. 8 and FIG. 11). The connecting portion of the substantially circular arc surface 30 at the tip end side in the arm portion 27 and the above described guide surface 29a has a rounded shape.

The lamp holding part 23 preferably has a size such that even when the thickness of the cold cathode tube 17 (to be mounted) is the minimum value in the tolerance range, both the arm portions 27 elastically opens and deforms a little in the mounted state, and the respective point contact portions 32 and 33 are firmly in contact with the peripheral surface of the cold cathode tube 17 to be able to hold the cold cathode tube 17 without backlash.

Recessed portions 34 are respectively provided on the inner peripheral surfaces (surfaces opposed to the cold cathode tube 17) in both arm portions 27. In more detail, the recessed portions 34 are disposed between the adjacent substantially circular arc surfaces 30 and 31 (between the tip end portion and the root portion, at the connecting region of the connecting portion 28) of the inner peripheral surface of the arm portion 27. Each of the recessed portions 34 has a substantially circular arc shape that is more acute (e.g., having a relatively small radius of curvature) than the respective substantially circular arc surfaces 30 and 31. The recessed portions 34 are preferably formed over the entire width of the arm portion 27, and extend deeper toward the central portion in the circumferential direction. The outer peripheral surface of the arm portions 27 in the portion provided with the recessed portions 34 (the surface opposite to the opposed surface of the recessed portions 34) is bulged outward, in the direction extending away from the cold cathode tube 17, by an amount by which the arm portion 27 is recessed due to the recessed portion 34, and thereby, the arm portion 27 is formed to have substantially uniform thickness over substantially the entire length thereof. The arm portion 27 is allowed to open and deform with the region at the root side of the portion provided with the recessed portion 34 as the support point, so that the tip end portion bends to displace in the direction away from the peripheral surface of the cold cathode tube 17. Thereby, as compared with the case where the recessed portion 34 is not provided, the elastic rebound force of the arm portion 27, in other words, the operation force required for opening and deforming the arm portion 27 is reduced. In the arm portion 27, the total surface distance (arm length) from the root portion to the tip end portion (that is a free end) increased by the amount that the portion provided with the recessed portion 34 is bulged outward.

A pin 24 which is capable of abutting on the optical member 15 is provided on the top surface of the mounting plate 21 to be protruded upward (in the same direction as the lamp holding part 23) as shown in FIG. 3. The pin 24 preferably has a substantially conical shape (tapered shape) with its tip end rounded, and can support the optical member 15 with its tip end portion. The height dimension of the pin 24 is preferably larger than the lamp holding part 23, for example, about three times as large as the lamp holding part 23, and therefore, when mounting the lamp clip 20 to the base 14, a worker can perform an operation by gripping the pin 24. The pin 24 is preferably located at the middle position between the lamp holding part 23 at the left end and the lamp holding part 23 at the center, and at the position corresponding to the back side of the locking part 22, and is disposed at the position where it overlaps a part of the locking part 22 with respect to the surface direction of the mounting plate 21, as shown in FIGS. 3 and 4.

As shown in FIG. 3, abutting portions 35 and 36 capable of abutting on the top surface of the base 14 at the time of mounting are arranged on the undersurface of the mounting plate 21 so as to protrude downward. The abutting portions 35 and 36 are preferably provided at three spots that are at an approximately central position in the long side direction in the mounting plate 21, and the positions near both ends, and have the sectional shapes formed into bow-shapes. The central abutting portion 35 is disposed at the central position with respect to the short side direction in the mounting plate 21, and is formed into a spherical crown shape capable of being in point contact with the base 14, as shown in FIGS. 3 and 5. Meanwhile, the abutting portions 36 at both ends preferably have a substantially semi-cylindrical shape extending in the short side direction of the mounting plate 21, and are capable of being in line contact with the base 14 with respect to the same direction. Both the abutting portions 36 are disposed near the ends from the lamp holding parts 23 at both ends in the mounting plate 21. The protruding amount of each of the abutting portions 35 and 36 from the mounting plate 21 is set at the amount which allows warpage to occur to the mounting plate 21 by the abutting portions 35 and 36 abutting on the base 14 even if a clearance occurs between the mounting plate 21 and the base 14 at the time of mounting due to an error in manufacture of the lamp clip 20.

As shown in FIGS. 3 and 5, at the central position in the lengthwise direction in the abutting portion 36 at the left end, a positioning pin 37 capable of being fitted in a positioning hole 14b provided in the base 14 is provided. The positioning pin 37 can prevent erroneous mounting because it is mismatched with the positioning hole 14b if the mounting plate 21 is wrongly oriented when the lamp clip 20 is mounted to the base 14.

The present preferred embodiment has the structure as described above, and its operation will be described next. While the liquid crystal panel 11 is manufactured, the assembling operation of the backlight device 12 is performed. During assembly of the backlight device 12, the operation of mounting each of the lamp clips 20 to the base 14 is performed.

While the pin 24 of the lamp clip 20 is gripped, and while the respective locking parts 22 are matched with the respective mounting holes 14a of the base 14 and the positioning pin 37 is matched with the positioning hole 14b, the mounting plate 21 is pressed against the top surface of the base 14. Then, the respective locking parts 22 are inserted into the respective mounting holes 14a, and the positioning pin 37 is fitted into the positioning hole 14b. In the process in which the locking part 22 is inserted into the mounting hole 14a, both the elastic locking pieces 26 are engaged with the peripheral edge of the front side of the mounting hole 14a, and thereby elastically deforms to approach the base part 25 temporarily, and when they reach the predetermined depth, they restore to the original state and their locking surfaces 26a are locked to the peripheral edge at the back side of the mounting hole 14a (see FIG. 3). Thereby, the lamp clip 20 is held in the mounted state with respect to the base 14.

After each of the lamp clips 20 is mounted to the base 14, the operation of mounting the cold cathode tubes 17 is performed. The cold cathode tubes 17 are held by the lamp clips 20 in the state in which two of them are paired by the holders 18 being fitted to both end portions thereof, as shown in FIG. 1.

Incidentally, variations in the thickness of the cold cathode tube 17 cannot be prevented from occurring more or less due to manufacturing errors, as described above. However, according to the lamp clip 20 of this preferred embodiment, the cold cathode tubes 17 of any thickness in the tolerance range can be held favorably as will be described in detail below.

Figure 7:
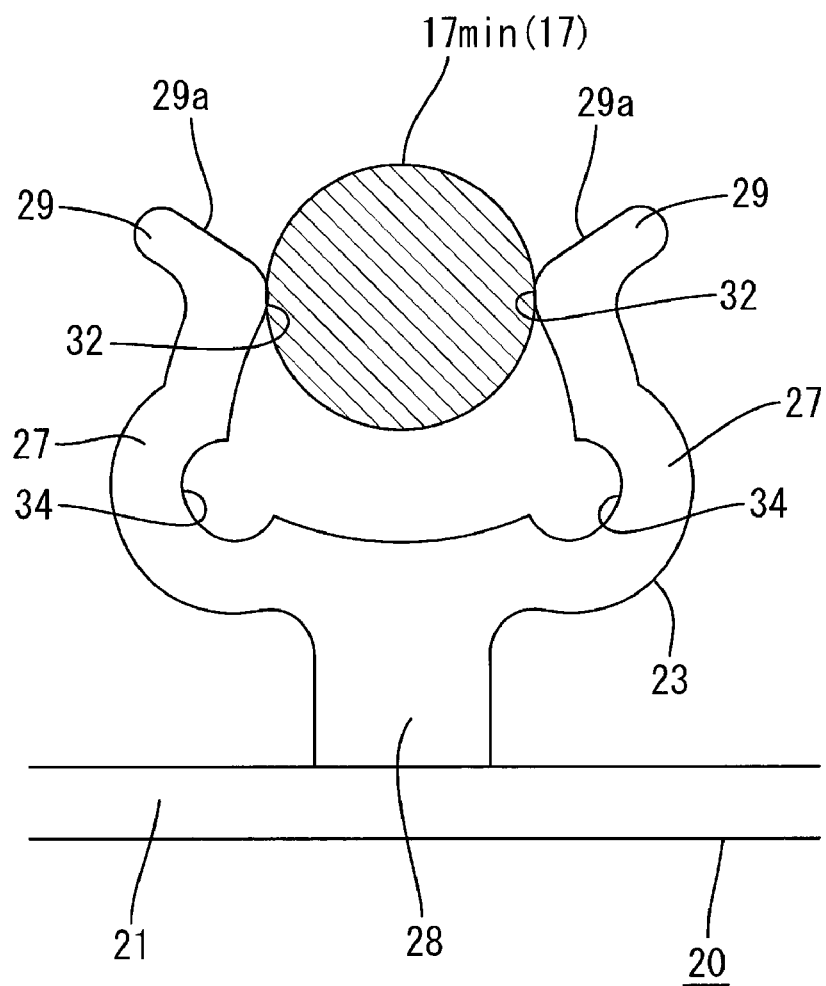
FIG. 7 is an enlarged front view showing the state of the process of mounting the thinnest cold cathode tube in the tolerance range.

First, the case where the outside diameter dimension of the cold cathode tube 17 to be mounted is the minimum value in the tolerance range, that is, the case where the thinnest cold cathode tube 17min that can be manufactured is mounted will be described. When the cold cathode tube 17min is pressed downward while being guided by both the guide portions 29 of the lamp holding part 23 from the state shown in FIG. 6, both the arm portions 27 elastically open and deform with the region at the side of the roots in the portions provided with the recessed portions 34 as the support points, and the gap between both the tip end portions is widened, whereby entry of the cold cathode tube 17min is allowed, as shown in FIG. 7.

Figure 8:
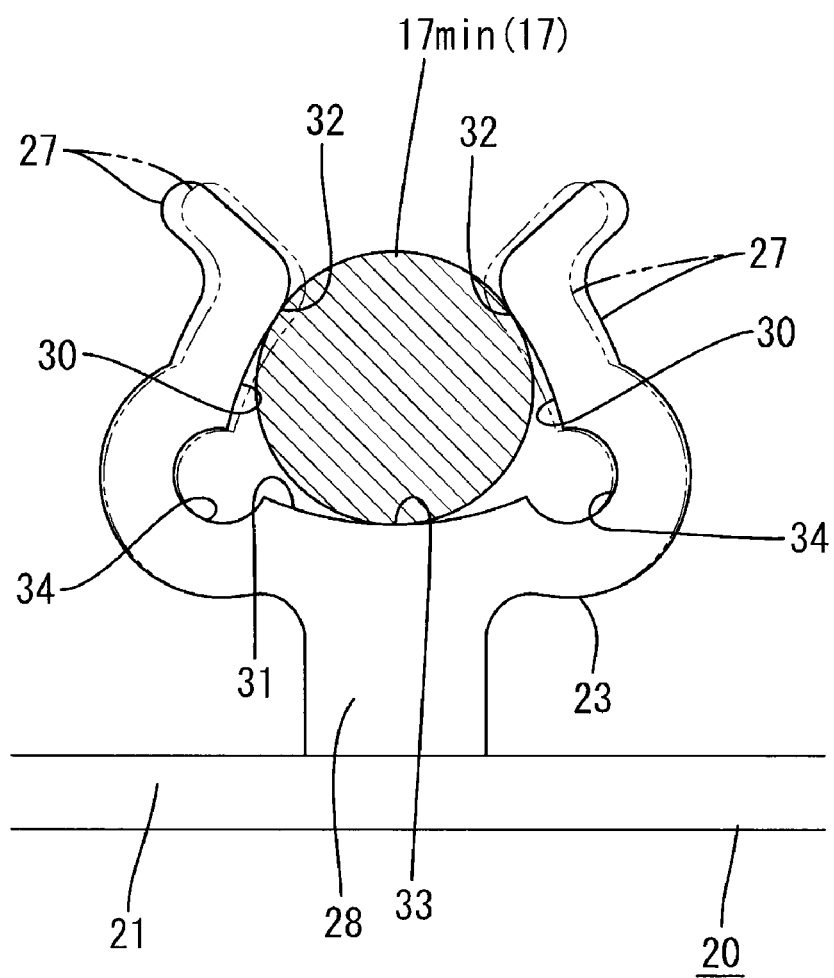
FIG. 8 is an enlarged front view of the state in which the thinnest cold cathode tube in the tolerance range is mounted.
Figure 9:
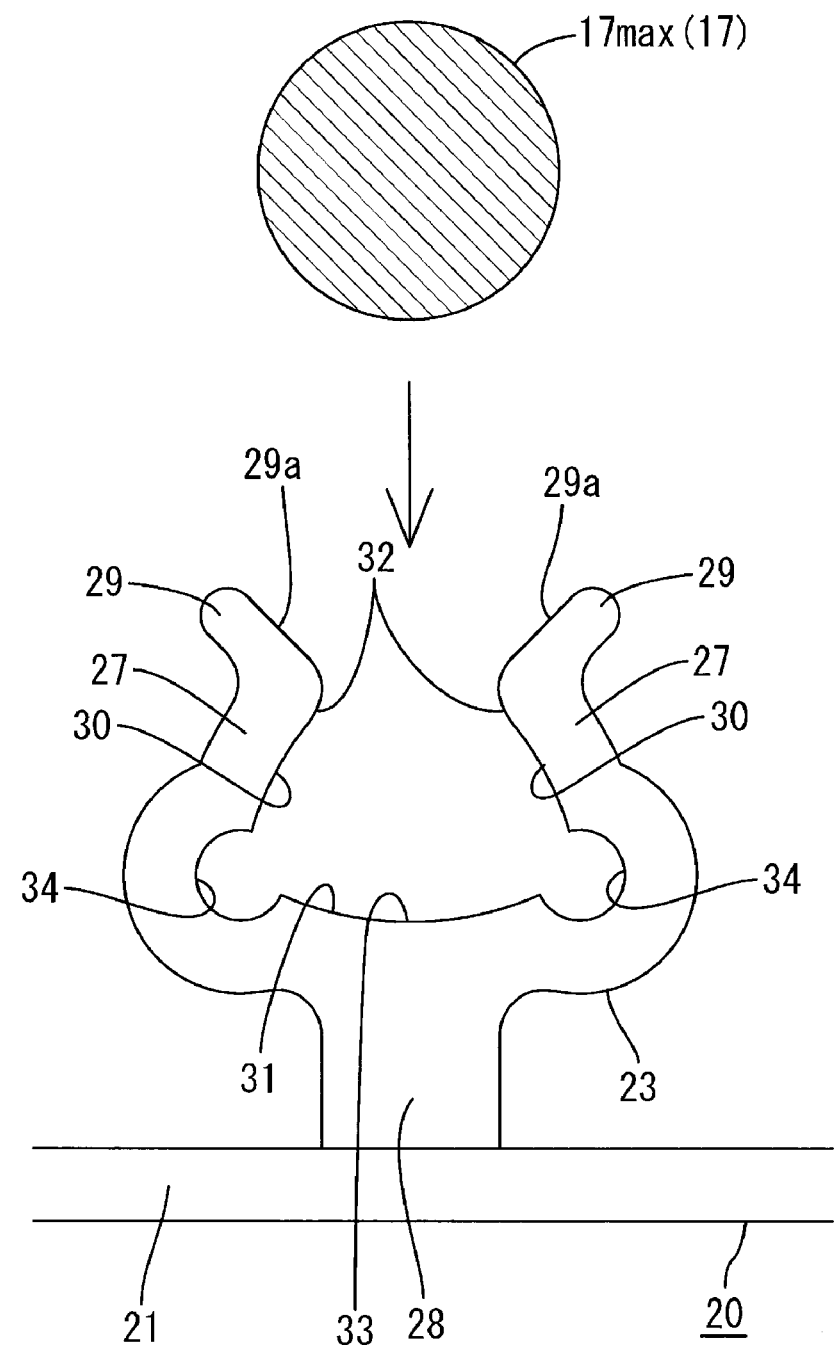
FIG. 9 is an enlarged front view showing the state before the thickest cold cathode tube in the tolerance range is mounted.
Figure 10:
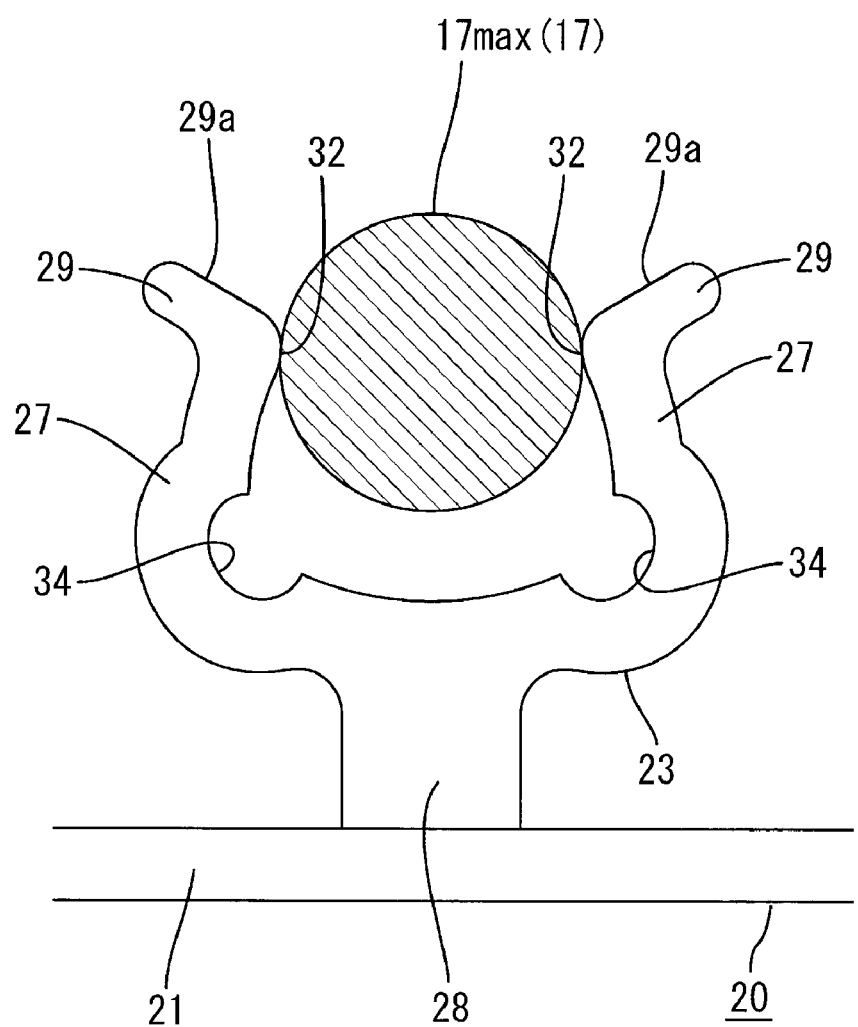
FIG. 10 is an enlarged front view showing the state of the process of mounting the thickest cold cathode tube in the tolerance range is mounted.
Figure 11:
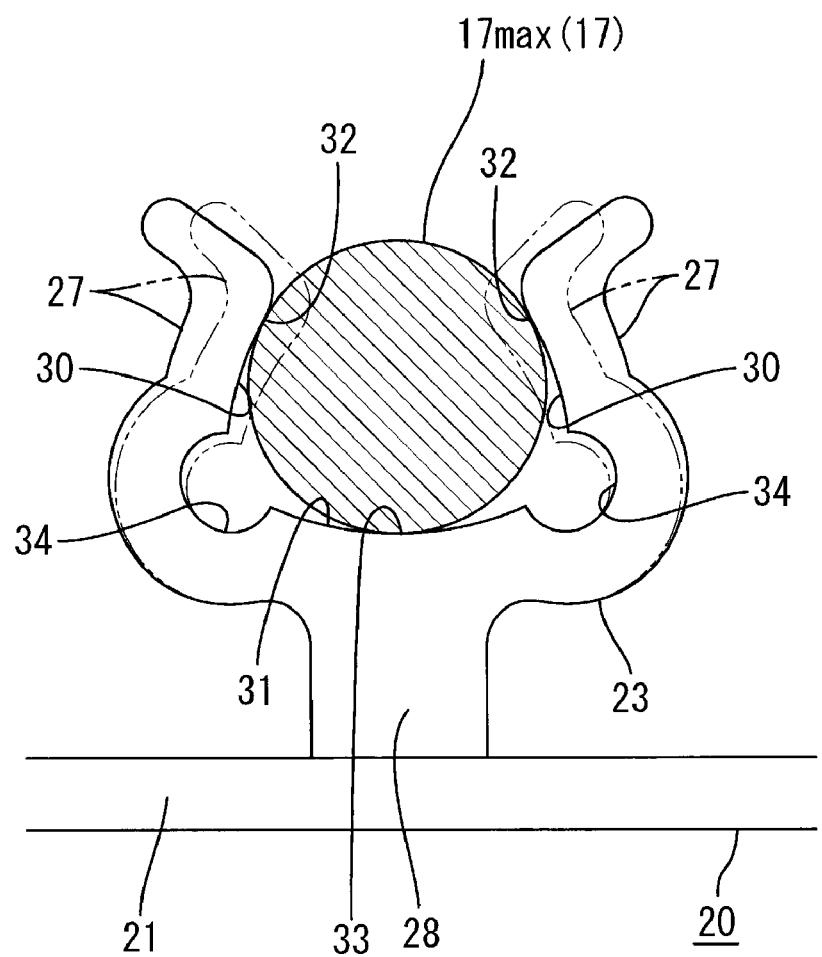
FIG. 11 is an enlarged front view showing the state in which the thickest cold cathode tube in the tolerance range is mounted.

Then, when the cold cathode tube 17min passes between the tip end portions of both the arm portions 27, both the arm portions 27 close to predetermined positions, and the respective point contact portions 32 and 33 are in contact with the peripheral surface of the cold cathode tube 17min, whereby the cold cathode tube 17min is supported at the three points, as shown in FIG. 8. At this time, both the arm portions 27 do not elastically restore to the natural state (the phantom lines in FIG. 8 show the arm portions 27 in the natural state), When the cold cathode tube 17max is pressed to the back, both the arm portions 27 close to predetermined positions (the positions where they are separated from each other more than the case of the thinnest cold cathode tube 17min), and the respective point contact portions 32 and 33 are brought into contact with the peripheral surface of the cold cathode tube 17max, whereby the cold cathode tube 17max is held in the mounted state (the phantom lines in FIG. 11 show the arm portions 27 in the natural state) as shown in FIG. 11. At this time, a gap between the tip end portions of both the arm portions 27 is wider as compared with the case of the thinnest cold cathode tube 17min, and therefore, there is the fear of the cold cathode tube 17max being forced out in the detaching direction by the elastic rebound force of both the arm portions 27. However, since the elastic rebound force of both the arm portions 27 is reduced by the recessed portions 34 as described above, the cold cathode tube 17max is difficult to urge in the detaching direction, and therefore, the cold cathode tube 17max can be stably held. When the cold cathode tube 17 is detached, both the arm portions 27 are elastically opened and deformed, and the operation force required on this occasion is similarly reduced.

After all the cold cathode tubes 17 are mounted as described above, the lamp holders 19 are mounted, the optical member 15 and the frame 16 are assembled to the base 14 in this sequence, whereby the backlight device 12 is formed. The liquid crystal display 10 is formed by integrally assembling the backlight device 12 and the liquid crystal panel 11 by the bezel 13 (see FIG. 1).

As described thus far, according to this preferred embodiment, the surface opposed to the cold cathode tube 17 in the lamp holding part 23, at the positions between the end portions and the connecting regions of the connecting portion 28, the recessed portions 34 allow the lamp holding part 23 to bend so that the end portions are displaced in the direction away from the peripheral surface of the cold cathode tube 17 are provided, and therefore, the elastic rebound force which occurs to the lamp holding part 23 at the time of opening deformation can be reduced. Accordingly, even if the size of the lamp holding part 23 is set so as to be able to hold the relatively thin cold cathode tube 17min without backlash, operability and holding performance on the occasion of attaching and detaching the relatively thick cold cathode tube 17max can be kept favorable. Thereby, even if the thickness of the cold cathode tube 17 varies for each product due to a manufacturing error, the backlash of the cold cathode tube 17 can be prevented and minimized while attaching and detaching operability and holding performance are kept favorable.

Since the recessed portion 34 has the substantially circular arc shape which is recessed deeply toward the central portion in the circumferential direction, concentration of the stress can be relieved when the lamp holding part 23 opens and deforms, and on the occasion of resin molding of the lamp clip 20, the resin material in the molten state easily flows in the mold, which is favorable for manufacture.

The surface opposite to the opposed surface of the recessed portion 34 of the lamp holding part 23 is formed to bulge in the direction away from the cold cathode tube 17, and the lamp holding part 23 is preferably formed to have substantially uniform thickness over substantially the entire length thereof. Therefore, as compared with a structure in which the portion provided with the recessed portion of the lamp holding part is locally made thin, stress concentration hardly occurs, and the resin material in the molten state easily flows inside the mold at the time of resin molding of the lamp clip 20, which is favorable for manufacture.

The lamp holding part 23 preferably includes a pair of arm portions 27 which extend symmetrically in the opposite directions to each other from the connecting portion 28, and the recessed portions 34 are respectively provided at both the arm portions 27. Therefore, the elastic rebound force of both the arm portions 27 can be uniformly reduced, and operability and holding performance can be made more favorable.

The point contact portions 32 and 33 capable of being in point contact with the peripheral surface of the cold cathode tube 17 are provided at the tip end positions of both the arm portions 27 (and the root positions of both the arm portions 27, of the surfaces opposite to the cold cathode tube 17 in the lamp holding part 23) so as to be able to support the cold cathode tube 17 at three points. Therefore, the cold cathode tube 17 can be pressed by both the point contact portions 32 provided at the tip end positions of both the arm portions 27 in the held state, and the cold cathode tube 17 can be held stably and securely.

Further, the substantially circular arc surfaces 30 and 31 having smaller, more gradual curvatures than the curvature of the peripheral surface of the cold cathode tube 17 are formed at the root portions of both arm portions 27, of the opposed surfaces opposite to the cold cathode tube 17 in the lamp holding part 23, and thereby, the point contact portions 33 are provided in the approximately central position. Therefore, the mounted cold cathode tube 17 can be located in the center and can be stably and securely held.

Since the lamp clip 20 is preferably made of a synthetic resin, it is easily manufactured, and cost reduction can be achieved.

Since the lamp clip 20 is preferably white, the lamp clip 20 hardly shields or reflects light emitted from the cold cathode tube 17 as compared with the case where the lamp clip is black, for example. Thereby, when the liquid crystal display device 10 is displayed by lighting the cold cathode tube 17, the pin 24 is hardly recognized visually by an audience (reduction in luminance or the like is prevented), and therefore, display performance of the liquid crystal display device 10 is favorable.

The present invention is not limited to the preferred embodiment described above. The following preferred embodiments are also included in the technical range of the present invention.

Figure 12:
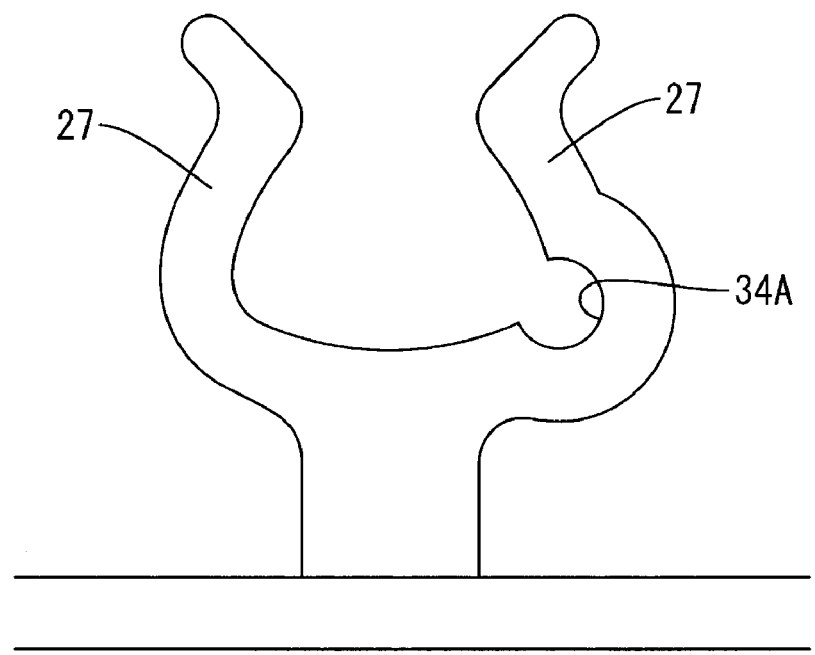
FIG. 12 is an enlarged front view showing a lamp holding part according to another preferred embodiment of the present invention.

In the above described preferred embodiment, the recessed portions 34 preferably are respectively provided at both the arm portions 27. But as shown in, for example, FIG. 12, a recessed portion 34A provided at only one of the arm portions 27 is also included in the present invention. In contrast with this, a plurality of recessed portions may be provided at one arm portion.

Figure 13:
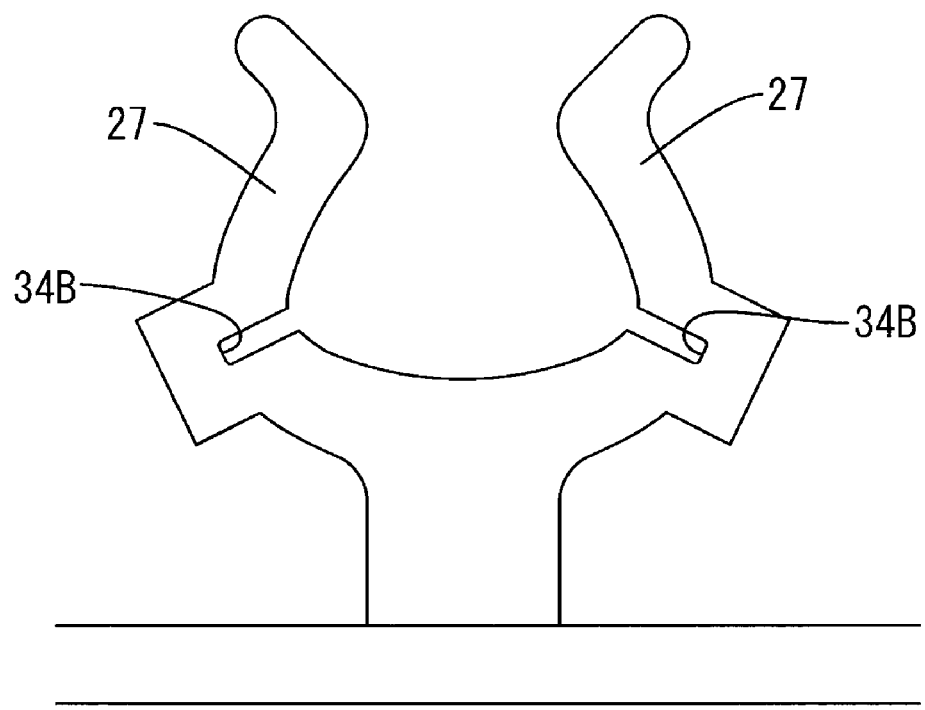
FIG. 13 is an enlarged front view showing a lamp holding part according to another preferred embodiment of the present invention.

In the above described preferred embodiment, the recessed portion 34 preferably has the substantially circular arc shape along the circumferential direction in the inner surface of the arm portion 27. However, as shown in, for example, FIG. 13, a recessed portion 34B may preferably have a substantially square shape, which is also included in the present invention. In this case, if the corner portions in the recessed portion 34B are preferably rounded, stress concentration can be relieved.

Figure 14:
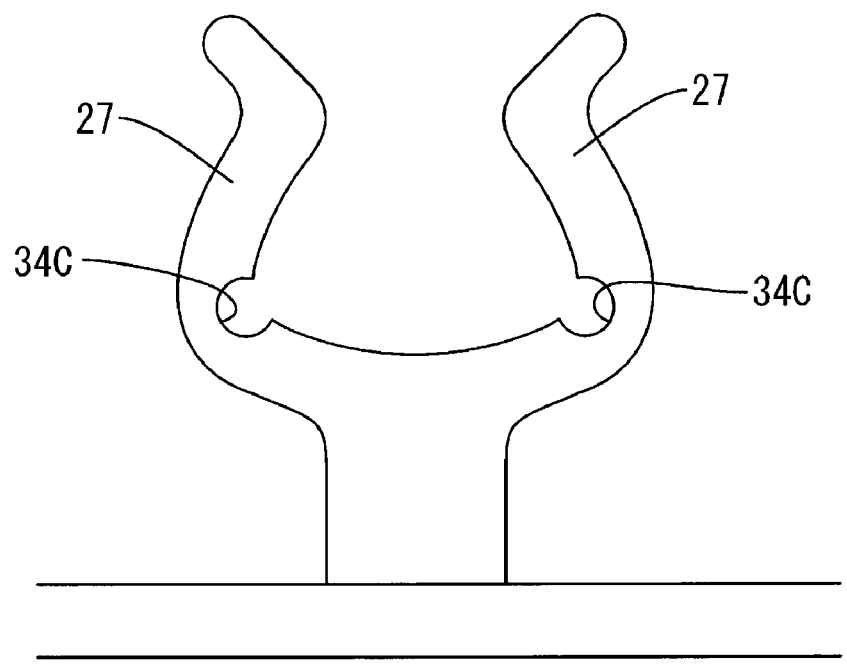
FIG. 14 is an enlarged front view showing a lamp holding part according to another preferred embodiment of the present invention.

In the above described preferred embodiment, the arm portion 27 has substantially uniform thickness over substantially the entire length. However, as shown in, for example, FIG. 14, the portion provided with a recessed portion 34C of the arm portion 27 that is locally made thin is also included in the present invention. In this case, if the recessed portion 34C has a substantially circular arc shape along the circumferential direction, stress concentration can be relieved.

Figure 15:
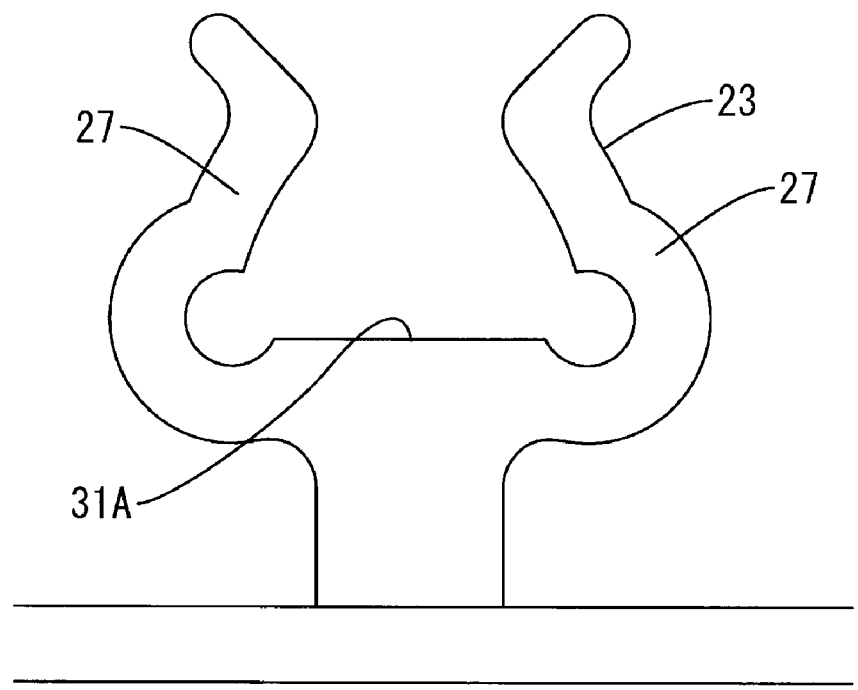
FIG. 15 is an enlarged front view showing a lamp holding part according to another preferred embodiment of the present invention.

In the above described preferred embodiment, the substantially circular arc surface 31 is preferably formed at the root portions of both the arm portions 27 of the surface opposite to the cold cathode tube 17 in the lamp holding part 23. However, as shown in, for example, FIG. 15, a flat surface 31A is also included in the present invention. Likewise, the substantially circular arc surface 30 which is provided at the tip end portion of the arm portion 27 can be replaced with a flat surface. In this case, the arm portion 27 can be also brought into point contact with the cold cathode tube 17. Further, a curved surface other than the substantially circular arc surface and flat surface may be formed.

In the above described preferred embodiment, the lamp holding part 23 supports the cold cathode tube 17 preferably at three points. However, the spots where the lamp holding part 23 is in point contact with the cold cathode tube 17 may be set at three or less or three or more. The lamp holding part 23 in plane contact with the peripheral surface of the cold cathode tube 17 with respect to the circumferential direction is also included in the present invention.

In the above described preferred embodiments, the cold cathode tube 17 is preferably used as a lamp. However, other kinds of lamps such as, for example, hot cathode tubes may be used and is also included in the present invention.

In the above described preferred embodiment, the backlight device 12 has the lamp clip 20 preferably mounted to the substantially box-shaped base 14. However, the lamp clip 20 mounted to a planar base with the peripheral wall removed, for example, is also included in the present invention.

In the above described preferred embodiment, the lamp clip 20 is preferably white, but it may be made colorless and transparent, or may be made semitransparent and semiopaque. With this, the lamp clip 20 easily transmits light emitted from the cold cathode tube 17, and it becomes more difficult for the situation in which the light is shielded and reflected to occur. Thereby, when the cold cathode tube 17 is lit to cause the liquid crystal device 10 to display, it becomes difficult for an audience to recognize the pin 24 visually (reduction in luminance or the like is prevented), and therefore, display performance of the liquid crystal display 10 becomes even more favorable. With respect to the color of the lamp clip 20, colors other than the above described color are also included in the present invention.

In the above described preferred embodiment, the lamp clip 20 is preferably made of the synthetic material, and polycarbonate is preferably used as the synthetic resin material. However, synthetic resin materials other than this may be used. The material of the lamp clip 20 is not limited to the synthetic resin material, and the other kinds of materials can be used. When synthetic resin materials other than polycarbonate, or materials other than the synthetic materials are used, the color of the lamp clip 20 can be any of white, colorless and transparent, and semitransparent and semi-opaque.

The present invention is also applicable to a liquid crystal display device using a switching element other than a TFT. The present invention is also applicable to liquid crystal displays which perform black and white display other than the liquid crystal displays which perform color display.

In the above described preferred embodiments, the liquid crystal display is shown, but the present invention is also applicable to the displays using backlight devices other than the liquid crystal displays.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A lamp holder comprising:
a mounting portion;
a lamp holding part connected to said mounting portion and including an end arranged to surround a peripheral surface of a lamp, and is capable of being elastically opened and deformed during attaching and detaching of the lamp to the lamp holding part; and
a recessed portion positioned at an opposed surface of the lamp holding part that is opposite to said lamp and that is between an end portion and a connecting region connected to said mounting portion; wherein
the recessed portion is arranged to allow the lamp holding part to bend so that said end portion displaces in a direction away from the peripheral surface of said lamp;
said lamp holding part includes a pair of arm portions extending symmetrically in opposite directions from said mounting portion such that, when the pair of arm portions surround a lamp, the pair of arm portions surround portions of a peripheral surface of the lamp that are directly opposed in a radial direction of the lamp; and
the lamp holding part includes a portion at a surface opposite to said recessed portion that bulges in a direction away from said lamp, and said lamp holding part has substantially uniform thickness over substantially an entire length thereof.

2. The lamp holder according to claim 1, wherein said recessed portions are respectively provided at both of said arm portions.

3. The lamp holder according to claim 1, wherein point contact portions capable of being in point contact with the lamp are provided at the opposed surface opposite to said lamp in said lamp holding part, at tip end positions of both of said arm portions, and at root positions of both the arm portions, such that the lamp is capable of being supported at three points in a point contact manner.

4. The lamp holder according to claim 3, further including root portions at both of said arm portions having a substantially circular arc shape with a smaller curvature than a curvature of the peripheral surface of the lamp, the root portions positioned at the opposed surface opposite to said lamp in said lamp holding part, wherein one of said point contact portions is provided at an approximately central position of the substantially circular arc shape.

5. A lamp holder comprising:
a mounting portion;
a lamp holding part connected to said mounting portion and including an end arranged to surround a peripheral surface of a lamp, and is capable of being elastically opened and deformed during attaching and detaching of the lamp to the lamp holding part; and
a recessed portion positioned at an opposed surface of the lamp holding part that is opposite to said lamp and that is between an end portion and a connecting region connected to said mounting portion; wherein
the recessed portion is arranged to allow the lamp holding part to bend so that said end portion displaces in a direction away from the peripheral surface of said lamp;
said lamp holding part includes a pair of arm portions extending symmetrically in opposite directions from said mounting portion such that, when the pair of arm portions surround a lamp, the pair of arm portions surround portions of a peripheral surface of the lamp that are directly opposed in a radial direction of the lamp;
said recessed portion has a substantially circular arc shape that is recessed more deeply toward a central portion thereof; and
the lamp holding part includes a portion at a surface opposite to said recessed portion that bulges in a direction away from said lamp, and said lamp holding part has substantially uniform thickness over substantially an entire length thereof.

6. A lamp holder comprising:
a mounting portion;
a lamp holding part connected to said mounting portion and including an end arranged to surround a peripheral surface of a lamp, and is capable of being elastically opened and deformed during attaching and detaching of the lamp to the lamp holding part; and
a recessed portion positioned at an opposed surface of the lamp holding part that is opposite to said lamp and that is between an end portion and a connecting region connected to said mounting portion; wherein
the recessed portion is arranged to allow the lamp holding part to bend so that said end portion displaces in a direction away from the peripheral surface of said lamp;
said lamp holding part includes a pair of arm portions extending symmetrically in opposite directions from said mounting portion such that, when the pair of arm portions surround a lamp, the pair of arm portions surround portions of a peripheral surface of the lamp that are directly opposed in a radial direction of the lamp; and
said recessed portion is respectively provided at both of said arm portions.

7. The lamp holder according to claim 6, wherein said recessed portion has a substantially circular arc shape that is recessed more deeply toward a central portion thereof.

8. The lamp holder according to claim 7, wherein said recessed portions are respectively provided at both of said arm portions.

9. The lamp holder according to claim 7, wherein point contact portions capable of being in point contact with the lamp are provided at the opposed surface opposite to said lamp in said lamp holding part, at tip end positions of both of said arm portions, and at root positions of both the arm portions, such that the lamp is capable of being supported at three points in a point contact manner.

10. The lamp holder according to claim 9, further including root portions at both of said arm portions having a substantially circular arc shape with a smaller curvature than a curvature of the peripheral surface of the lamp, the root portions positioned at the opposed surface opposite to said lamp in said lamp holding part, wherein one of said point contact portions is provided at an approximately central position of the substantially circular arc shape.

11. The lamp holder according to claim 6, wherein point contact portions capable of being in point contact with the lamp are provided at the opposed surface opposite to said lamp in said lamp holding part, at tip end positions of both of said arm portions, and at root positions of both the arm portions, such that the lamp is capable of being supported at three points in a point contact manner.

12. The lamp holder according to claim 11, further including root portions at both of said arm portions having a substantially circular arc shape with a smaller curvature than a curvature of the peripheral surface of the lamp, the root portions positioned at the opposed surface opposite to said lamp in said lamp holding part, wherein one of said point contact portions is provided at an approximately central position of the substantially circular arc shape.

13. The lamp holder according to claim 11, wherein the lamp has a tubular shape.

14. The lamp holder according claim 11, wherein said lamp holder is made of a synthetic resin and is white.

15. The lamp holder according to said claim 14, wherein the lamp has a tubular shape.

16. A lamp holder comprising:
   a mounting portion;
   a lamp holding part connected to said mounting portion and including an end arranged to surround a peripheral surface of a lamp, and is capable of being elastically opened and deformed during attaching and detaching of the lamp to the lamp holding part; and
   a recessed portion positioned at an opposed surface of the lamp holding part that is opposite to said lamp and that is between an end portion and a connecting region connected to said mounting portion; wherein
   the recessed portion is arranged to allow the lamp holding part to bend so that said end portion displaces in a direction away from the peripheral surface of said lamp;
   said lamp holding part includes a pair of arm portions extending symmetrically in opposite directions from said mounting portion such that, when the pair of arm portions surround a lamp, the pair of arm portions surround portions of a peripheral surface of the lamp that are directly opposed in a radial direction of the lamp; and point contact portions capable of being in point contact with the lamp are provided at the opposed surface opposite to said lamp in said lamp holding part, at tip end positions of both of said arm portions, and at root positions of both the arm portions, such that the lamp is capable of being supported at three points in a point contact manner.

17. The lamp holder according to claim 16, further including root portions at both of said arm portions having a substantially circular arc shape with a smaller curvature than a curvature of the peripheral surface of the lamp, the root portions positioned at the opposed surface opposite to said lamp in said lamp holding part, wherein one of said point contact portions is provided at an approximately central position of the substantially circular arc shape.

* * * * *